United States Patent
Shao et al.

(10) Patent No.: US 11,941,366 B2
(45) Date of Patent: Mar. 26, 2024

(54) CONTEXT-BASED MULTI-TURN DIALOGUE METHOD AND STORAGE MEDIUM

(71) Applicant: UBTECH ROBOTICS CORP LTD, Shenzhen (CN)

(72) Inventors: Chi Shao, Shenzhen (CN); Dongyan Huang, Shenzhen (CN); Wan Ding, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 661 days.

(21) Appl. No.: 17/102,395

(22) Filed: Nov. 23, 2020

(65) Prior Publication Data
US 2021/0200961 A1    Jul. 1, 2021

Related U.S. Application Data

(63) Continuation of application No. PCT/CN2019/128198, filed on Dec. 25, 2019.

(51) Int. Cl.
*G06F 40/35* (2020.01)
*G06F 40/284* (2020.01)
*G06N 3/049* (2023.01)

(52) U.S. Cl.
CPC ............ *G06F 40/35* (2020.01); *G06F 40/284* (2020.01); *G06N 3/049* (2013.01)

(58) Field of Classification Search
CPC .... G06F 40/35; G06F 40/284; G06F 16/3329; G06N 3/049; G06N 5/041; G06N 3/044; G06N 3/045; G06N 3/048; G06N 3/006
See application file for complete search history.

(56) References Cited

U.S. PATENT DOCUMENTS

| 2016/0352656 | A1* | 12/2016 | Galley | H04L 51/02 |
| 2021/0026924 | A1* | 1/2021 | Jones | G06F 40/56 |
| 2021/0150146 | A1* | 5/2021 | Alexander | G06F 40/30 |

FOREIGN PATENT DOCUMENTS

| CN | 110309283 A | 10/2019 |
| CN | 110472035 A | 11/2019 |

OTHER PUBLICATIONS

Wu, Yu, et al. "Sequential matching network: A new architecture for multi-turn response selection in retrieval-based chatbots." arXiv preprint arXiv:1612.01627 (May 15, 2017), pp. 1-10 (Year: 2017).*

(Continued)

*Primary Examiner* — Jesse S Pullias
*Assistant Examiner* — Michael C. Lee

(57) ABSTRACT

The present disclosure discloses a context-based multi-turn dialogue method. The method includes: obtaining to-be-matched historical dialogue information; performing a word feature extraction based on the to-be-matched historical dialogue information to obtain a historical dialogue word embedding; obtaining candidate answer information; performing the word feature extraction based on the candidate answer information to obtain a candidate answer word embedding; obtaining a historical dialogue partial matching vector and a candidate answer partial matching vector by performing partial semantic relationship matching based on the historical dialogue word embedding and the candidate answer word embedding; obtaining a candidate answer matching probability by performing a matching probability calculation based on the historical dialogue partial matching vector and the candidate answer partial matching vector; and determining matched answer information based on the candidate answer information and the candidate answer matching probability.

10 Claims, 9 Drawing Sheets

(56) References Cited

OTHER PUBLICATIONS

Dong, Jianxiong, et al. "Enhance word representation for out-of-vocabulary on ubuntu dialogue corpus." arXiv preprint arXiv:1802.02614 (2018), pp. 1-12 (Year: 2018).*

Young, Tom, et al. "Augmenting end-to-end dialogue systems with commonsense knowledge." Proceedings of the AAAI conference on artificial intelligence. (2018), pp. 4970-4977 (Year: 2018).*

Ganhotra, Jatin, et al. "Knowledge-incorporating esim models for response selection in retrieval-based dialog systems." arXiv preprint arXiv:1907.05792 (Jul. 11, 2019), pp. 1-7 (Year: 2019).*

Tao, Chongyang, et al. "Multi-representation fusion network for multi-turn response selection in retrieval-based chatbots." Proceedings of the twelfth ACM international conference on web search and data mining. (Feb. 11-15, 2019), pp. 267-275 (Year: 2019).*

Devlin, Jacob, et al. "Bert: Pre-training of deep bidirectional transformers for language understanding." arXiv preprint arXiv:1810.04805 (May 24, 2019), pp. 1-16 (Year: 2019).*

Chen, Qian, et al. "Sequential matching model for end-to-end multi-turn response selection." IEEE International Conference on Acoustics, Speech and Signal Processing (ICASSP). (Apr. 17, 2019), pp. 7350-7354 (Year: 2019).*

Yoon, Wonjin, et al. "Pre-trained Language Model for Biomedical Question Answering." arXiv preprint arXiv:1909.08229 (Sep. 18, 2019), pp. 1-15 (Year: 2019).*

"Enhanced LSTM for Natural Language Inference", Qian Chen et al., «arXiv:1609.06038v3», pp. 1-12, 2017.

* cited by examiner

CONTEXT-BASED MULTI-TURN DIALOGUE METHOD AND STORAGE MEDIUM

The present application is a continuation-application of International Application PCT/CN2019/128198, with an international filing date of Dec. 25, 2019, the contents of all of which are hereby incorporated by reference.

BACKGROUND

1. Technical Field

The present disclosure relates to natural language processing technology, and particularly to a context-based multi-turn dialogue method as well as a storage medium.

2. Description of Related Art

The construction of intelligent human-machine dialogue systems that can interact with humans is an important research topic in artificial intelligence technology. Dialogue systems can be roughly divided into single-turn dialogue systems and multi-turn dialogue systems. A single-turn dialogue usually does not involve contextual information, its system has no memory function, and the turns are independent to each other. Contrarily, a multi-turn dialogue needs to consider contextual information, which is more challenging to implement the multi-turn dialogue system in comparison with the single-turn dialogue.

At present, there are two main methods for modeling multi-turn dialogue systems: generation-based and retrieval-based methods. The generation-based method usually uses a large amount of corpus to learn an answer generative model that includes an encoder-decoder framework, and the retrieval-based method refers to selecting the best answer for the context of multi-turn dialogue from a candidate library. In which, there are two typical methods for selecting the answer: hierarchy-based methods and sequence-based methods. The sequence-based method usually connects the context into a long sequence, and the hierarchy-based method models each sentence separately, and then models the interactions between the sentences. However, when the context and the answer sequence have different characteristics, the existing models usually have the problem of insufficient matching between the context and the answer, which affects the selection of the best answer in the multi-turn dialogue. Therefore, it is necessary to develop a multi-turn dialogue method that can realize the sufficient matches between the context and the answer when the context and the answer sequence have different characteristics.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

In which.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure. All other embodiments obtained by those skilled in the art without creative efforts are within the scope of the present disclosure.

Figure 1:
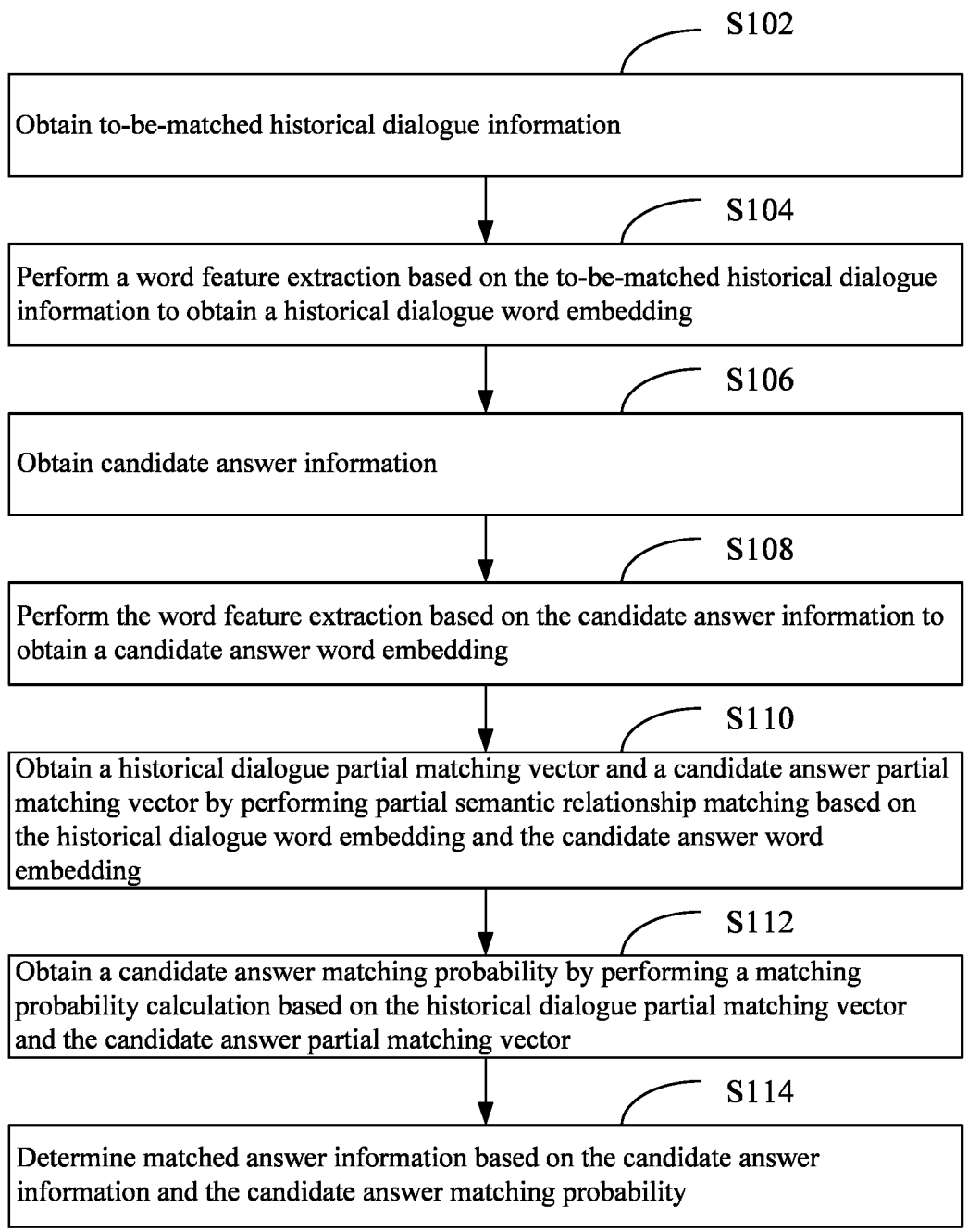
FIG. 1 is a flow chart of a context-based multi-turn dialogue method according to an embodiment of the present disclosure.
Figure 8:
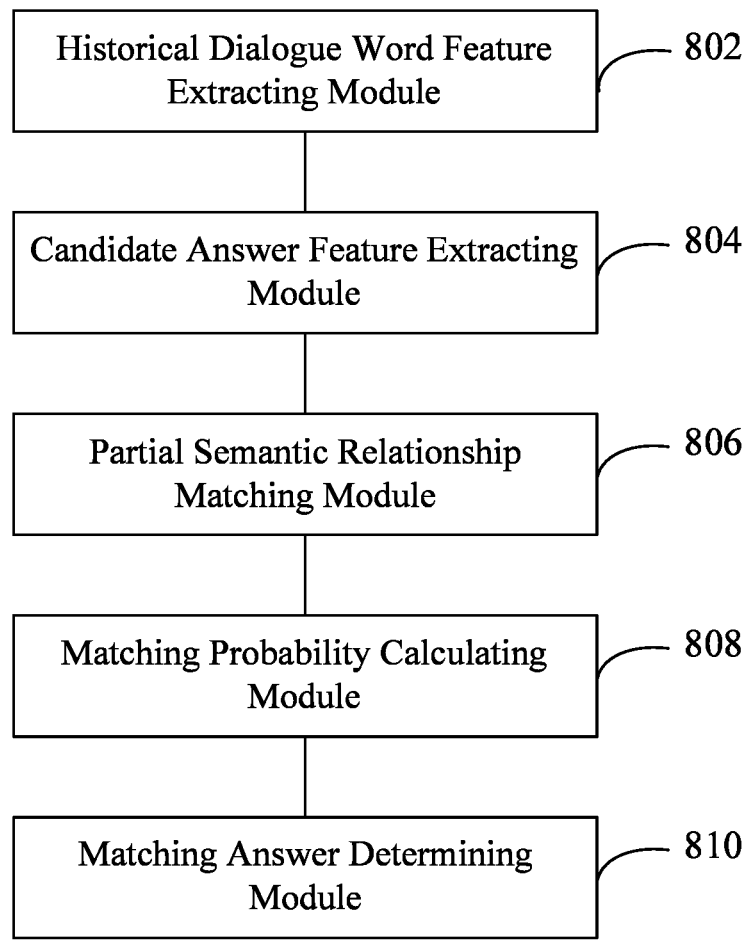
FIG. 8 is a schematic block diagram of the structure of a context-based multi-turn dialogue apparatus according to an embodiment of the present disclosure.
Figure 9:
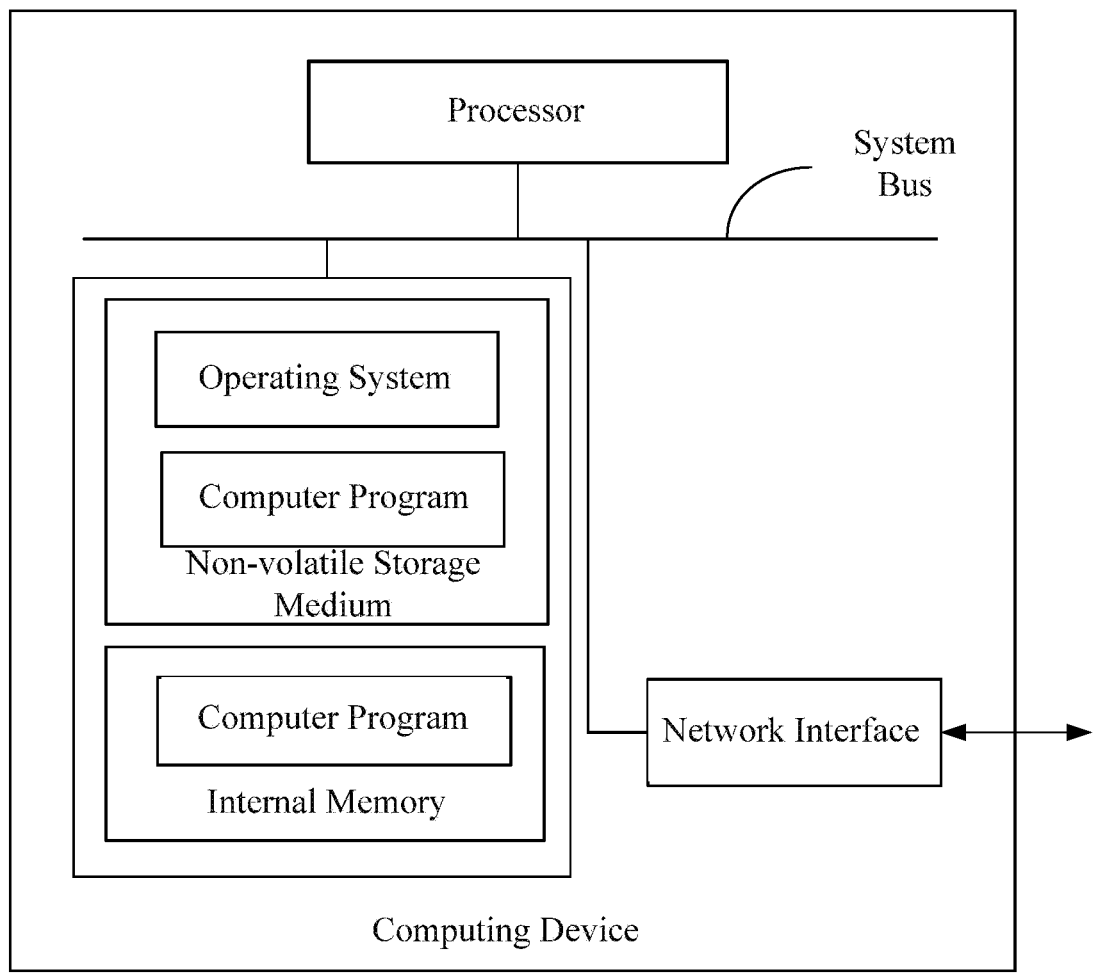
FIG. 9 is a schematic block diagram of the structure of a computing device according to an embodiment of the present disclosure.

FIG. 1 is a flow chart of a context-based multi-turn dialogue method according to an embodiment of the present disclosure. As shown in FIG. 1, in this embodiment, a context-based multi-turn dialogue method is provided. The method is a computer-implemented method executable for a processor, which may be implemented through a context-based multi-turn dialogue apparatus as shown in FIG. 8 or a computing device as shown in FIG. 9. The method includes the following steps.

S102: obtaining to-be-matched historical dialogue information.

In this embodiment, historical dialogue information is obtained from a text input device, a database, or a network, and the historical dialogue information is used as the to-be-matched historical dialogue information, so as to retrieve and determine matched answer information based on the context of the to-be-matched historical dialogue information, thereby realizing intelligent multi-turn dialogue. For example, the obtained historical dialogue information includes the multi-turn dialogue "A: hi B: hello A: may I help you".

S104: performing a word feature extraction based on the to-be-matched historical dialogue information to obtain a historical dialogue word embedding.

In which, the to-be-matched historical dialogue information is segmented according to a word segmentation rule first, then a to-be-predicted historical dialogue token sequence is composed using the tokens obtained through the word segmentation, and then the to-be-predicted historical dialogue token is extracted from the historical dialogue token sequence, and finally the word feature extraction is performed on each token in the entire to-be-predicted historical dialogue token to obtain the historical dialogue word embedding.

The token can be considered as a meaningful unit in semantic processing. The word segmentation refers to the process of converting a character sequence into a token sequence in computer science. The process of generating tokens from the input character stream is called tokenization.

The word feature extraction is to directly extract the word embedding with contextual meaning after reading the entire to-be-predicted historical dialogue token, and capture the bidirectional relationship and association information of the context in the to-be-predicted historical dialogue token.

S106: obtaining candidate answer information.

In this embodiment, answer information is obtained from a candidate answer database, and the answer information is used as the candidate answer information, so as to determine a matching probability of each candidate answer information based on the context of the to-be-matched historical dialogue information.

In one embodiment, the candidate answer information includes a complete sentence of dialogue information. As an example, the answer information "I would like to check in" is obtained from the candidate answer database.

S108: performing the word feature extraction based on the candidate answer information to obtain a candidate answer word embedding.

In which, the candidate answer information is segmented according to the word segmentation rule first, all the tokens obtained through the word segmentation are composed to generate a candidate answer token sequence, and the candidate answer token sequence is used as a to-be-predicted candidate answer token, and then the word feature extraction is performed on each token in the entire to-be-predicted candidate answer token to obtain the candidate answer word embedding.

It is understandable that, the word feature extraction is performed on each token in the entire to-be-predicted historical dialogue token and the word feature extraction is performed on each token in the to-be-predicted candidate answer token by using the same word feature extraction neural network model.

S110: obtaining a historical dialogue partial matching vector and a candidate answer partial matching vector by performing partial semantic relationship matching based on the historical dialogue word embedding and the candidate answer word embedding.

In this embodiment, the tokens of the historical dialogue word embedding and the candidate answer word embedding are aligned using cross attention mechanism, the semantic relationship is calculated at the token level, then partial matching information is collected, and the historical dialogue partial matching vector and the candidate answer partial matching vector are obtained based on the partial matching information, so that the historical dialogue word embedding and the candidate answer word embedding establish a partial semantic relationship.

S112: obtaining a candidate answer matching probability by performing a matching probability calculation based on the historical dialogue partial matching vector and the candidate answer partial matching vector.

In one embodiment, BiLSTM (bi-directional long short-term memory, which is composed of forward LSTM and backward LSTM, and is often used to model context information in natural language processing task) is used to read the historical dialogue partial matching vector and the candidate answer partial matching vector for synthesization, and max pooling and average pooling are performed on the hidden vector output by BiLSTM, and then the results of the poolings are combined to obtain a fixed-length vector to feed into a multi-layer perceptron for classification, and a matching probability calculation model is trained and obtained by minimizing the cross-entropy loss in an end-to-end manner.

In which, LSTM refers to long short-term memory, which is a kind of RNN (recurrent neural network). Due to its design characteristics, LSTM is very suitable for modeling time series data such as text data.

In one embodiment, steps S106-S112 are repeated until the candidate answer matching probabilities for all the candidate answer information are calculated.

S114: determining matched answer information based on the candidate answer information and the candidate answer matching probability.

In one embodiment, the highest probability is selected from all the candidate answer matching probabilities. In the case that the highest probability corresponds to one candidate answer information, the candidate answer information corresponding to the highest probability is used as the matched answer information. In the case that the highest probability corresponds to at least two candidate answer information, the dialogue type is obtained; if the dialogue type is a task-oriented dialogue, all the candidate answer information corresponding to the highest probability is used as the matched answer information; and if the dialogue type is a chat-oriented dialogue, the candidate answer information corresponding to the highest probability that has the token of the longest in its length is used as the matched answer information.

In this embodiment, the context-based multi-turn dialogue method obtains the historical dialogue word embedding by performing the word feature extraction on the to-be-matched historical dialogue information, and performs the word feature extraction based on the candidate answer information to obtain the candidate answer word embedding, so as to extract the historical dialogue word embedding according to the feature of the context and extract the candidate answer word embedding according to the features of the answer sequence, thereby better capturing the bidirectional relationship and association information of the context. Then the partial semantic relationship matching is performed based on the historical dialogue word embedding and the candidate answer word embedding to obtain the historical dialogue partial matching vector and the candidate answer partial matching vector, thereby realizing the sufficient matching of the context and the answer.

In one embodiment, the step S102 of obtaining to-be-matched historical dialogue information includes: obtaining historical dialogue information; and obtaining the to-be-matched historical dialogue information by performing a forward obtaining on the historical dialogue information according to a preset word length. In this embodiment, historical dialogue information is obtained from a text input device, a database, or a network, and a last part of the historical dialogue information is used as the to-be-matched historical dialogue information, where the length of the to-be-matched historical dialogue information is equal to the preset word length. Since the older dialogue information is less important to select the answer and the newer dialogue information is more important to select the answer, by using the last part of the historical dialogue information as the to-be-matched historical dialogue information, the matching efficiency is improved while ensuring the accuracy of determining the matched answer information.

The preset word length refers to a preset number of words.

In one embodiment, the step S104 of performing the word feature extraction based on the to-be-matched historical dialogue information to obtain the historical dialogue word embedding includes: performing a token extraction on the to-be-matched historical dialogue information to obtain the to-be-predicted historical dialogue tokens; and inputting each token in the entire to-be-predicted historical dialogue tokens into a pre-trained model for prediction to obtain the historical dialogue word embedding. As an example, the to-be-matched historical dialogue information is segmented to obtain tokens, all the tokens are composed to generate a historical dialogue token sequence, and the to-be-predicted historical dialogue tokens are extracted from the historical dialogue token sequence, and then each token in the entire to-be-predicted historical dialogue token is input into the word feature extraction neural network model to perform the word feature extraction so as to obtain the historical dialogue word embedding.

In the word feature extraction neural network model, "Transformer" is used a as the main framework of the algorithm, and a pre-training is performed using masked language prediction and next sentence prediction, where the masked language prediction and next sentence prediction are unsupervised prediction tasks.

The masked language prediction refers to randomly masking part of the tokens, and then predicting the concealed tokens. During the training, 15% of the tokens in each token sequence are randomly masked, rather than predicting every token like other models. It randomly masks some tokens from the input to predict the original vocabulary of the masked tokens based on its context, so that a deep bidirectional Transformer model can be pre-trained. The encoder of Transformer does not know which words it will be asked to predict, or which words have been replaced by random tokens, so it has to maintain a distributed contextual representation for each input token. In addition, when performing 15% of the token operations in the masked token sequence, the tag [MASK] is not always used to replace the word to be predicted, but the tag [MASK] is used to replace the word to be predicted in 80% of the cases, while a random word is used to replace the word to be predicted in 10% of the cases and the word is remained unchanged in 10% of the cases. Since only 1.5% of all the tokens will be randomly replaced, it will not affect the understanding of the model to the language.

For the next sentence prediction, many sentence-level tasks such as automatic question and answer (Q&A) and natural language inference (NLI) need to understand the relationship between two sentences. For example, in the tasks of the above-mentioned masked language prediction, 15% of the tokens will be masked after the first step of model processing. Then, the goal of the task of the next sentence prediction is to train a model that understands the relationship between sentences. As an example, it is to train a binary classification task for the next sentence prediction. First, it selects two sentences referred to as sentence A and sentence B for each untrained example to form a sentence pair. In 50% of the cases, sentence B is just the next sentence of sentence A, that is, sentence A and sentence B are continuous; and in the other 50% of the cases, sentence B is a random sentence from a corpus library, that is, sentence A and sentence B are not continuous. Then, it uses the Transformer model to identify which ones among these sentence pairs are continuous and which ones of that are discontinuous.

Figure 2:
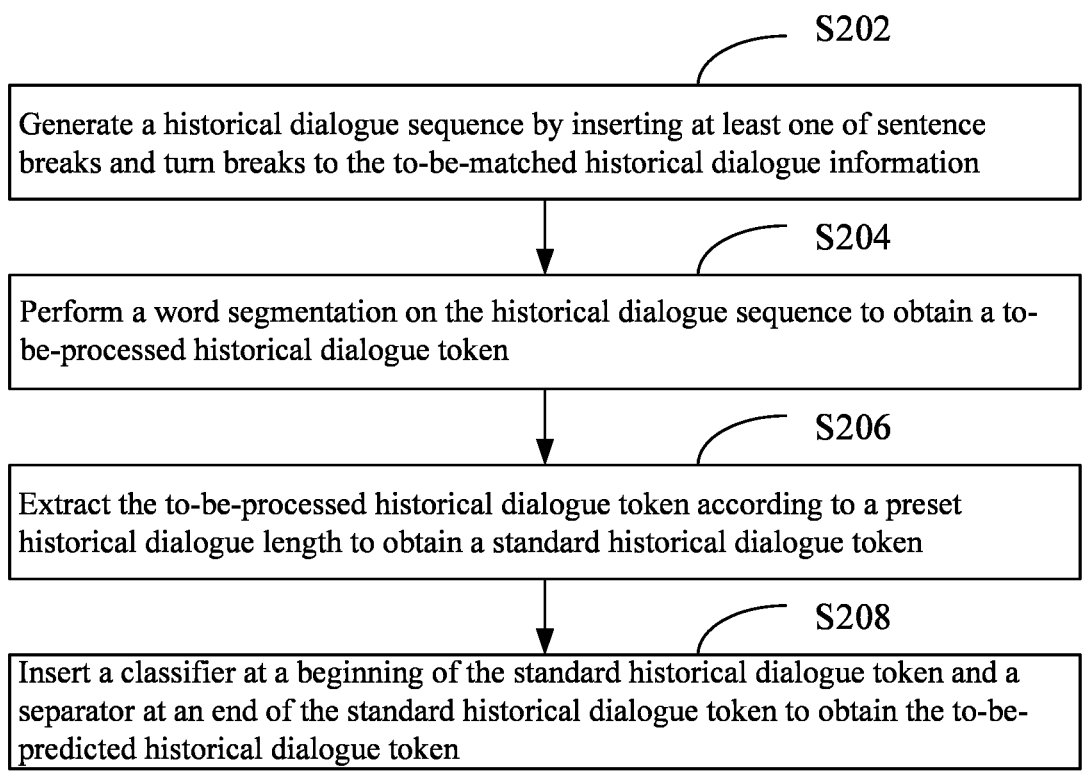
FIG. 2 is a flow chart of determining a to-be-predicted historical dialogue token in the context-based multi-turn dialogue method of FIG. 1.

FIG. 2 is a flow chart of determining a to-be-predicted historical dialogue token in the context-based multi-turn dialogue method of FIG. 1. As shown in FIG. 2, in this embodiment, the step of performing the token extraction on the to-be-matched historical dialogue information to obtain the to-be-predicted historical dialogue tokens includes the following steps.

S202: generating a historical dialogue sequence by inserting at least one of sentence breaks and turn breaks to the to-be-matched historical dialogue information.

In this embodiment, a sentence break is embedded at the end of each sentence of the to-be-matched historical dialogue information, a turn break is embedded at the end of each sentence of the to-be-matched historical dialogue information, and the to-be-matched historical dialogue information added with the sentence break and the turn break is connected as the historical dialogue sequence. In which, for the sentence needs to embed the sentence break and the turn break simultaneously, the turn break is placed after the sentence break.

For example, if the sentence break is set to eou (abbreviation of end-of-utterance), the turn break is set to eot (abbreviation of end-of-turn), and the historical dialogue information includes a multi-turn dialogue "A: hi B: hello A: may I help you", then the obtained historical dialogue sequence is "hi<eou><eot>hello<eou><eot> may I help you<eou><eot>".

S204: performing a word segmentation on the historical dialogue sequence to obtain a to-be-processed historical dialogue token.

In this embodiment, the historical dialogue sequence is segmented, all of its tokens are formed as a historical dialogue token sequence, and the historical dialogue token sequence is used as the to-be-processed historical dialogue token.

It can be understood that, when segmenting the historical dialogue sequence, each <eou> and each <eot> added in step S202 can be respectively taken as a token.

S206: extracting the to-be-processed historical dialogue token according to a preset historical dialogue length to obtain a standard historical dialogue token.

In this embodiment, the last part of the to-be-processed historical dialogue token is used as the standard historical dialogue token, and the length of the standard historical dialogue token is the same as the preset historical dialogue length.

The preset historical dialogue length refers to the number of the tokens.

For example, if the historical dialogue sequence is "hi<eou><eot>hello <eou><eot> may I help you <eou><eot>" and the preset historical dialogue length is set to 10, the standard historical dialogue token will be "<eot>hello <eou><eot> may I help you <eou><eot>".

S208: inserting a classifier at a beginning of the standard historical dialogue token and a separator at an end of the standard historical dialogue token to obtain the to-be-predicted historical dialogue token.

In this embodiment, a classifier is inserted at the beginning of the standard historical dialogue token, and a separator is inserted at the end of the standard historical dialogue token, and the standard historical dialogue token after the classifier and the separator are inserted is used as examples of the to-be-predicted historical dialogue token.

The classifier includes [CLS], and the separator includes [SEP].

For example, if the standard historical dialogue token is "<eot>hello<eou><eot> may I help you <eou><eot>", then the to-be-processed historical dialogue token will be "[CLS] <eot>hello<eou><eot> may I help you<eou><eot>[SEP]".

It is understandable that, each classifier and each separator added in step S208 can be respectively taken as a token.

In one embodiment, the preset historical dialogue length plus the token length of the added classifier and separator is used as the maximum length of the to-be-predicted historical dialogue token.

Figure 3:
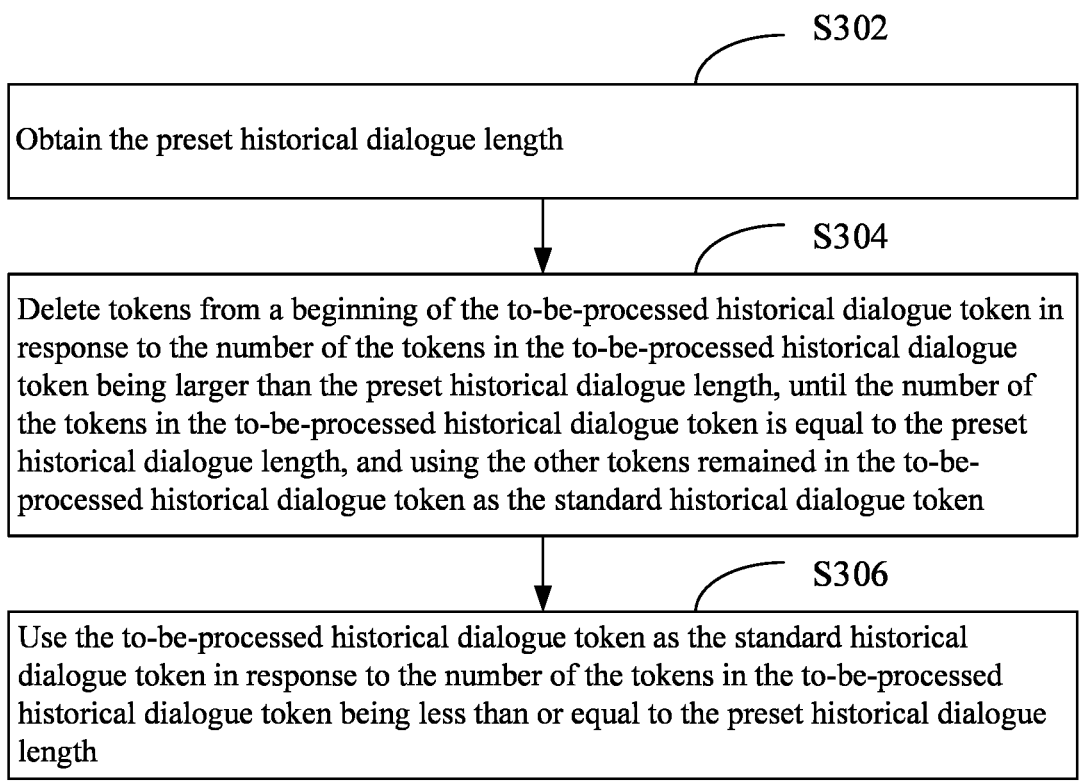
FIG. 3 is a flow chart of determining a standard historical dialogue token in the context-based multi-turn dialogue method of FIG. 1.

FIG. 3 is a flow chart of determining a standard historical dialogue token in the context-based multi-turn dialogue method of FIG. 1. As shown in FIG. 3, in this embodiment, the step S206 of extracting the to-be-processed historical dialogue token according to the preset historical dialogue length to obtain the standard historical dialogue token includes the following steps.

S302: obtaining the preset historical dialogue length.

The preset historical dialogue length can be inputted by the user manually, or can be set automatically according to, for example, a preset value.

S304: deleting tokens from a beginning of the to-be-processed historical dialogue token in response to the number of the tokens in the to-be-processed historical dialogue token being larger than the preset historical dialogue length, until the number of the tokens in the to-be-processed historical dialogue token is equal to the preset historical dialogue length, and using the other tokens remained in the to-be-processed historical dialogue token as the standard historical dialogue token.

In the to-be-matched historical dialogue information in the multi-turn dialogue, the words at the rear of the dialogue is more important than the words at the front of the dialogue, and have a greater impact on the answer. Since the to-be-matched historical dialogue information may be long, the to-be-processed historical dialogue token may therefore be long, and the matching efficiency can be improved by taking a part therefrom.

S306: using the to-be-processed historical dialogue token as the standard historical dialogue token in response to the number of the tokens in the to-be-processed historical dialogue token being less than or equal to the preset historical dialogue length.

In this embodiment, by taking the most important part of the to-be-processed historical dialogue token as the standard historical dialogue token, the matching efficiency is improved while ensuring the accuracy of determining the matched answer information.

In one embodiment, the step S108 of performing a word feature extraction based on the to-be-matched historical dialogue information to obtain a historical dialogue word embedding includes: performing the token extraction on the candidate answer information to obtain a to-be-predicted candidate answer token; and inputting each token in the entire to-be-predicted candidate answer token into a pre-trained model for prediction to obtain the candidate answer word embedding.

In which, the candidate answer information is segmented first, all the tokens are composed to generate the candidate answer token sequence, the to-be-predicted candidate answer token is extracted from the candidate answer token sequence, and then each token in the entire to-be-predicted candidate answer token is input into the word feature extraction neural network model for extracting word features so as to obtain the candidate answer word embedding. In this embodiment, the word feature extraction neural network model for extracting the candidate answer word embedding has the same structure as the word feature extraction neural network model for extracting the historical dialogue word embedding.

Figure 4:
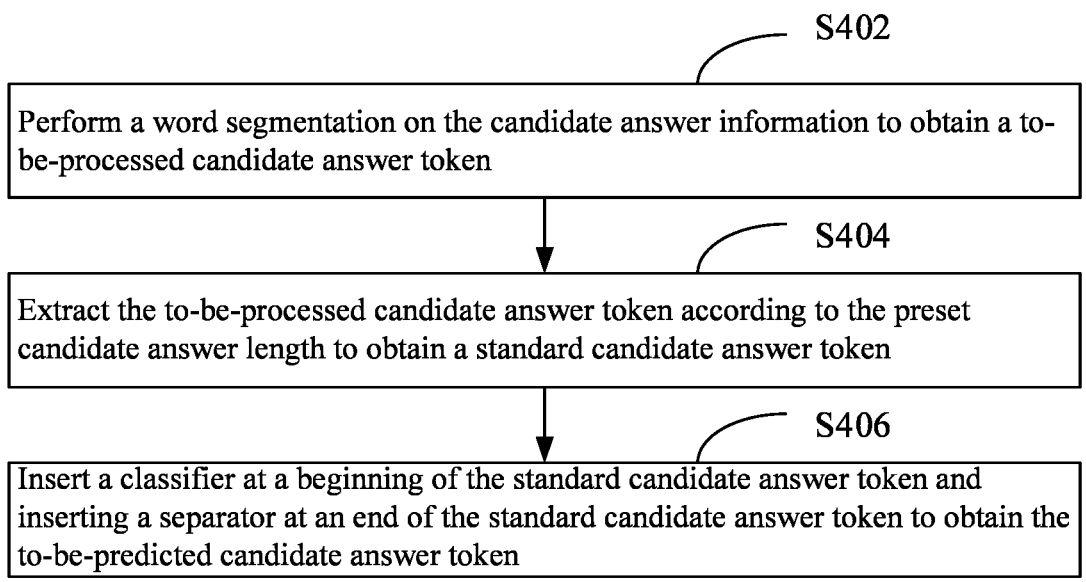
FIG. 4 is a flow chart of determining a to-be-predicted candidate answer token in the context-based multi-turn dialogue method of FIG. 1.

FIG. 4 is a flow chart of determining a to-be-predicted candidate answer token in the context-based multi-turn dialogue method of FIG. 1. As shown in FIG. 4, in this embodiment, the step of performing the token extraction on the candidate answer information to obtain a to-be-predicted candidate answer token includes the following steps.

S402: performing a word segmentation on the candidate answer information to obtain a to-be-processed candidate answer token.

In this embodiment, the word segmentation is performed on the candidate answer information, all the tokens are composed to generate the candidate answer token sequence, and the candidate answer token sequence is used as a to-be-processed candidate answer token.

S404: extracting the to-be-processed candidate answer token according to the preset candidate answer length to obtain a standard candidate answer token.

In this embodiment, the beginning part of the to-be-processed candidate answer token is obtained to use as the standard candidate answer token, and the length of the standard candidate answer token is the same as the preset candidate answer length.

The preset candidate answer length refers to the number of tokens.

For example, the to-be-processed candidate answer token is "I would like to check in", and the preset candidate answer length is 4, then the standard candidate answer token will be "I would like to".

S406: inserting a classifier at a beginning of the standard candidate answer token and inserting a separator at an end of the standard candidate answer token to obtain the to-be-predicted candidate answer token.

In this embodiment, a classifier is inserted at the beginning of the standard candidate answer token, a separator is inserted at the end of the standard candidate answer token, and the standard candidate answer token after the classifier and the separator are inserted is used as the to-be-predicted candidate answer token.

The classifier includes [CLS], and the separator includes [SEP].

For example, if the to-be-processed candidate answer token is "I would like to", the to-be-predicted candidate answer token will be "[CLS] I would like to [SEP]".

It is understandable that, each classifier and each separator added in step S406 can be taken as a token, respectively.

In one embodiment, the preset candidate answer length plus the token length of the added classifier and separator is used as the maximum length of the to-be-predicted candidate answer token.

Figure 5:
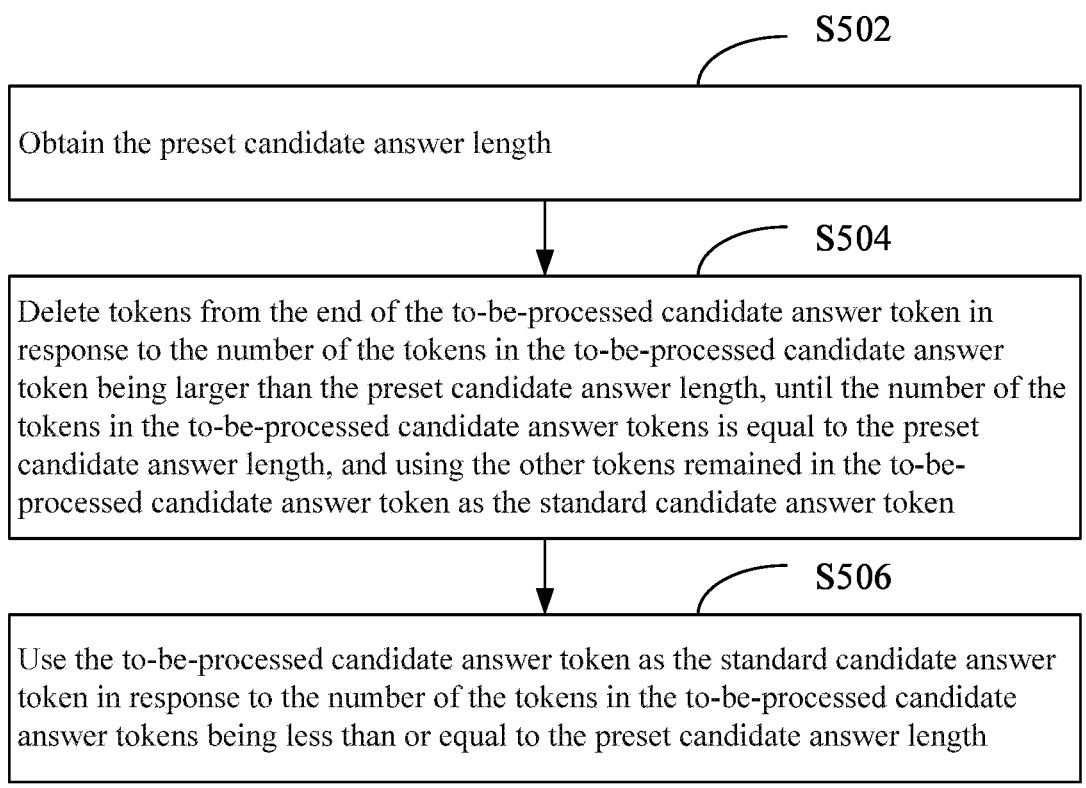
FIG. 5 is a flow chart of determining a standard candidate answer token in the context-based multi-turn dialogue method of FIG. 1.

FIG. 5 is a flow chart of determining a standard candidate answer token in the context-based multi-turn dialogue method of FIG. 1. As shown in FIG. 5, in this embodiment, the step S404 of extracting the to-be-processed candidate answer token according to the preset candidate answer length to obtain the standard candidate answer token includes the following steps.

S502: obtaining the preset candidate answer length.

The preset candidate answer length can be inputted by the user manually, or can be set automatically according to, for example, a preset value.

S504: deleting tokens from the end of the to-be-processed candidate answer token in response to the number of the tokens in the to-be-processed candidate answer token being larger than the preset candidate answer length, until the number of the tokens in the to-be-processed candidate answer tokens is equal to the preset candidate answer length, and using the other tokens remained in the to-be-processed candidate answer token as the standard candidate answer token.

In the to-be-processed candidate answer token in the multi-turn dialogue, the words at the front of the candidate answer token is more important than the words at the rear of the candidate answer token, and have a greater impact on the answer. Since the candidate answer information may be long, the to-be-processed candidate answer token may therefore be long, and the matching efficiency can be improved by taking a part therefrom.

S506: using the to-be-processed candidate answer token as the standard candidate answer token in response to the number of the tokens in the to-be-processed candidate answer tokens being less than or equal to the preset candidate answer length.

In this embodiment, by taking the most important part of the to-be-processed candidate answer token as the standard candidate answer token, the matching efficiency is improved while ensuring the accuracy of determining the matched answer information.

Figure 6:
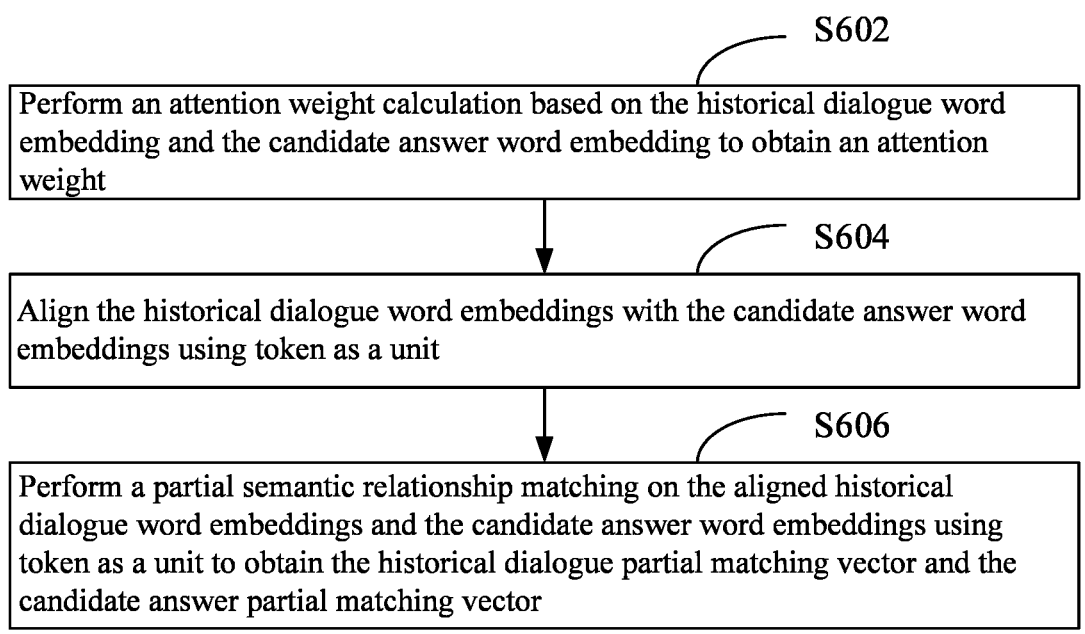
FIG. 6 is a flow chart of matching partial semantic relationship in the context-based multi-turn dialogue method of FIG. 1.

FIG. 6 is a flow chart of matching partial semantic relationship in the context-based multi-turn dialogue method of FIG. 1. As shown in FIG. 6, in this embodiment, the step 110 of obtaining the historical dialogue partial matching vector and the candidate answer partial matching vector by performing partial semantic relationship matching based on the historical dialogue word embedding and the candidate answer word embedding includes the following steps.

S602: performing an attention weight calculation based on the historical dialogue word embedding and the candidate answer word embedding to obtain an attention weight.

The formula for calculating the attention weight $e_{ij}$ is as follows:

$$e_{ij}=(c_i^s)^T r_i^3;$$

in which, $c_i^s$ is the historical dialogue word embedding corresponding to the i-th token in the to-be-predicted historical dialogue tokens, and $r_j^s$ is the candidate answer word embedding corresponding to the j-th token in the predicted candidate answer tokens, and T is the vector transposition calculation.

S604: aligning the historical dialogue word embeddings with the candidate answer word embeddings using token as a unit.

The historical dialogue word embeddings is aligned with the candidate answer word embeddings using token as the unit through the following formula:

$$\alpha_{ij} = \frac{\exp(e_{ij})}{\sum_{k=1}^{n} \exp(e_{ik})};$$

$$c_i^d = \sum_{j=1}^{n} \alpha_{ij} r_j^s;$$

$$\beta_{ij} = \frac{\exp(e_{ij})}{\sum_{k=1}^{n} \exp(e_{kj})}; \text{ and}$$

$$r_j^d = \sum_{j=1}^{n} \beta_{ij} c_i^s;$$

in which, $c_i^d$ is the relevant semantics of $c_i^s$ in a candidate answer, $r_j^d$ is the relevant semantics of $r_j^s$ in a historical dialogue, exp is an exponential function, n is the total number of the tokens in the to-be-predicted candidate answer token, m is the total number of the tokens in the to-be-predicted historical dialogue token, $c_i^s$ is the historical dialogue word embedding corresponding to the i-th token in the to-be-predicted historical dialogue token, $r_j^s$ is the candidate answer word embedding corresponding to the j-th token in the to-be-predicted candidate answer token, and $e_{ij}$ is the attention weight.

S606: performing a partial semantic relationship matching on the aligned historical dialogue word embeddings and the candidate answer word embeddings using token as a unit to obtain the historical dialogue partial matching vector and the candidate answer partial matching vector.

By comparing the vector pairs $\langle c_i^s, c_i^d \rangle$ and $\langle r_j^s, r_j^d \rangle$, the token-level semantic relationship between the aligned token pairs can be modeled.

The following formula is used to collect partial matching information based on the partial matching information:

$$c_i^l = F([c_i^s; c_i^d; c_i^s - c_i^d; c_i^s \otimes c_i^d]); \text{ and}$$

$$r_j^l = F([r_i^s; r_i^d; r_i^s - r_i^d; r_i^s \otimes r_i^d]);$$

in which, $c_i^l$ is the historical dialogue partial matching vector, $r_j^l$ is the candidate answer partial matching vector, $\otimes$ is the vector product, F( ) is the forward neural network layer with Relu activation function, $c_i^s$ is the historical dialogue word embedding corresponding to the i-th token in the to-be-predicted historical dialogue tokens, $c_i^d$ is the relevant semantics of $c_i^s$ in the candidate answer, $r_j^s$ is the candidate answer word embedding corresponding to the j-th token in the to-be-predicted candidate answer tokens, and $r_j^d$ is the related semantic of $r_j^s$ in the historical dialogue.

Figure 7:
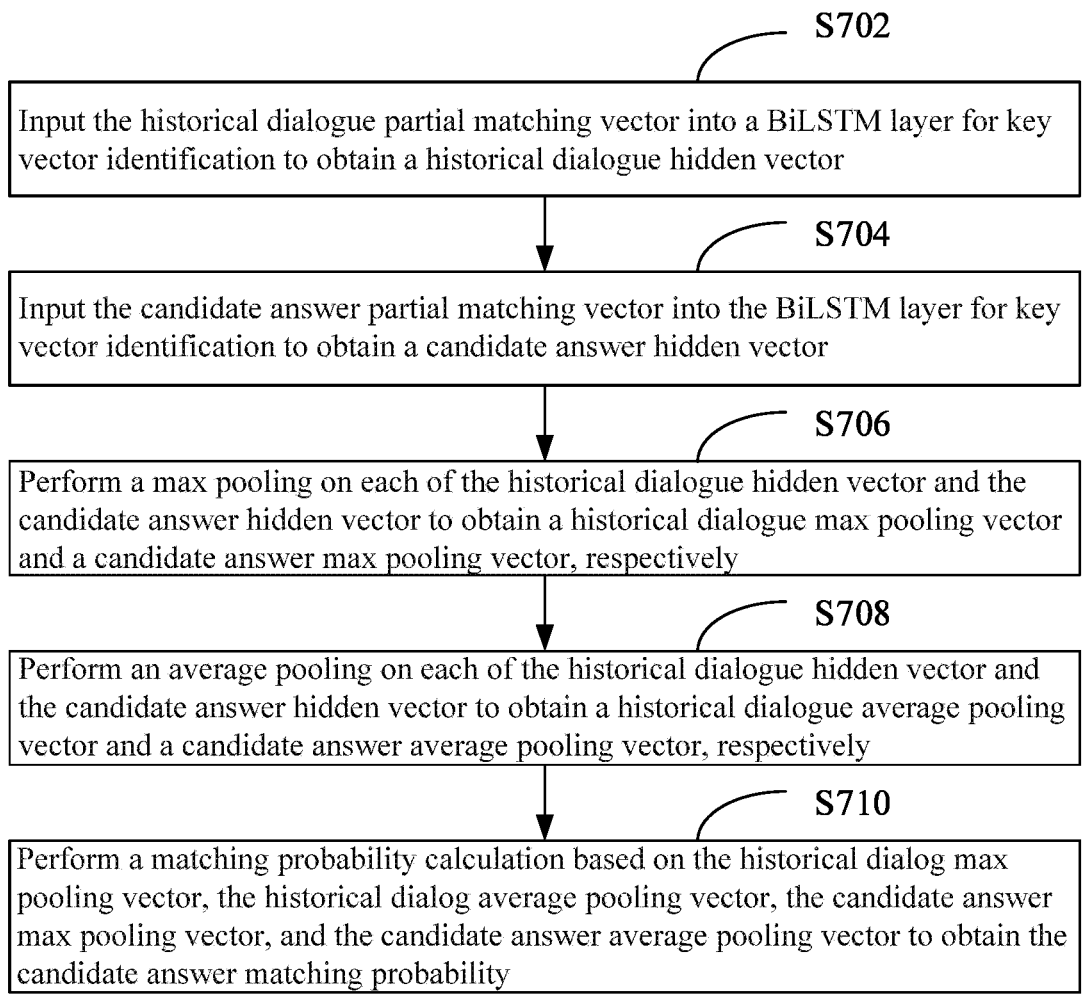
FIG. 7 is a flow chart of calculating matching probability in the context-based multi-turn dialogue method of FIG. 1.

FIG. 7 is a flow chart of calculating matching probability in the context-based multi-turn dialogue method of FIG. 1. As shown in FIG. 7, in one embodiment, the step S112 of obtaining the candidate answer matching probability by performing the matching probability calculation based on the historical dialogue partial matching vector and the candidate answer partial matching vector includes the following steps.

S702: inputting the historical dialogue partial matching vector into a BiLSTM layer for key vector identification to obtain a historical dialogue hidden vector.

The historical dialogue hidden vector $c_i^v$ is calculated through the following formula:

$$c_i^v = \text{BiLSTM}(c_i^l, i);$$

in which, is $c_i^l$ the historical dialogue partial matching vector, and BiLSTM( ) is the BiLSTM neural network layer.

S704: inputting the candidate answer partial matching vector into the BiLSTM layer for key vector identification to obtain a candidate answer hidden vector.

The candidate answer hidden vector $r_i^v$ is calculated through the following formula:

$$r_i^v = \text{BiLSTM}(r_i^l, i);$$

in which, $r_i^l$ is the candidate answer partial matching vector, and BiLSTM( ) is the BiLSTM neural network layer.

S706: performing a max pooling on each of the historical dialogue hidden vector and the candidate answer hidden vector to obtain a historical dialogue max pooling vector and a candidate answer max pooling vector, respectively.

In this embodiment, the max pooling is performed on $c_i^v$ to obtain the historical dialogue max pooling vector $c_{max}^v$, and the max pooling is performed on $r_i^v$ to obtain the candidate answer max pooling vector $r_{max}^v$.

S708: performing an average pooling on each of the historical dialogue hidden vector and the candidate answer hidden vector to obtain a historical dialogue average pooling vector and a candidate answer average pooling vector, respectively.

In this embodiment, the average pooling is performed on $c_i^v$ to obtain the historical dialogue average pooling vector $c_{mean}^v$, and the average pooling is performed on $r_i^v$ to obtain the candidate answer average pooling vector $r_{mean}^v$.

S710: performing a matching probability calculation based on the historical dialog max pooling vector, the historical dialog average pooling vector, the candidate answer max pooling vector, and the candidate answer average pooling vector to obtain the candidate answer matching probability.

In one embodiment, the step of performing the matching probability calculation based on the historical dialog max pooling vector, the historical dialog average pooling vector, the candidate answer max pooling vector, and the candidate answer average pooling vector to obtain the candidate answer matching probability includes: concatenating the candidate answer max pooling vector, the candidate answer average pooling vector, the historical dialogue max pooling vector, and the historical dialogue average pooling vector in sequence to obtain a to-be-classified vector; and inputting the to-be-classified vector into a multi-layer perceptron for performing the matching probability calculation to obtain the candidate answer matching probability.

In this embodiment, the historical dialog max pooling vector $c_{max}^v$, the historical dialog average pooling vector the candidate answer max pooling vector $r_{max}^v$, and the candidate answer average pooling vector $r_{mean}^v$ are concatenated in sequence to obtain the to-be-classified vector $[c_{max}^v; c_{mean}^v; r_{max}^v; r_{mean}^v]$. Then the to-be-classified vector is input into the multi-layer perceptron, and the cross-entropy loss is minimized in an end-to-end manner to train a matching probability calculation model y as follows:

$$y=\mathrm{MLP}([c_{max}^v; c_{mean}^v; r_{max}^v; r_{mean}^v]);$$

where, MLP( ) is the multi-layer perceptron;

In one embodiment, the multi-layer perceptron includes a hidden layer, a tan h activation function, and a softmax output layer.

FIG. 8 is a schematic block diagram of the structure of a context-based multi-turn dialogue apparatus according to an embodiment of the present disclosure. As shown in FIG. 8, in this embodiment, a context-based multi-turn dialogue apparatus is provided, where the apparatus includes:

a historical dialogue word feature extracting module 802 configured to obtain to-be-matched historical dialogue information including a multi-turn dialogue and perform a word feature extraction based on the to-be-matched historical dialogue information to obtain a historical dialogue word embedding;

a candidate answer feature extracting module 804 configured to obtain candidate answer information, and perform the word feature extraction based on the candidate answer information to obtain a candidate answer word embedding;

a partial semantic relationship matching module 806 configured to obtain a historical dialogue partial matching vector and a candidate answer partial matching vector by performing partial semantic relationship matching based on the historical dialogue word embedding and the candidate answer word embedding;

a matching probability calculating module 808 configured to obtain a candidate answer matching probability by performing a matching probability calculation based on the historical dialogue partial matching vector and the candidate answer partial matching vector; and a matching answer determining module 810 configured to determine matched answer information based on the candidate answer information and the candidate answer matching probability.

In this embodiment, the context-based multi-turn dialogue apparatus obtains the historical dialogue word embedding by performing the word feature extraction on the to-be-matched historical dialogue information, and performs the word feature extraction based on the candidate answer information to obtain the candidate answer word embedding, so as to extract the historical dialogue word embedding according to the feature of the context and extract the candidate answer word embedding according to the features of the answer sequence, thereby better capturing the bidirectional relationship and association information of the context. Then the partial semantic relationship matching is performed based on the historical dialogue word embedding and the candidate answer word embedding to obtain the historical dialogue partial matching vector and the candidate answer partial matching vector, thereby realizing the sufficient matching of the context and the answer.

FIG. 9 is a schematic block diagram of the structure of a computing device according to an embodiment of the present disclosure. In this embodiment, a computing device is provided. The computing device may specifically be a terminal device or a server. As shown in FIG. 9, the computing device includes a processor, a storage, and a network interface that are connected through a system bus. In which, the storage includes a non-volatile (or non-transitory) storage medium and an internal memory. The non-volatile storage medium of the computing device stores an operating system, and may also store a computer program. When the computer program is executed by the processor, it can make the processor to implement the above-mentioned context-based multi-turn dialogue method. The internal memory may also store with the computer program, and when the computer program is executed by the processor, it can make the processor to execute the context-based multi-turn dialogue method. Those skilled in the art can understand that, the structure shown in FIG. 9 is only a block diagram of part of the structure related to the context-based multi-turn dialogue method, and does not constitute a limitation on the computing device to which the context-based multi-turn dialogue method is applied. In other embodiments, the computing device can include more or fewer parts than shown in the figure, some parts can be or combined, or can have a different arrangement of parts.

In one embodiment, the context-based multi-turn dialogue method provided by the present disclosure can be implemented in the form of a computer program, and the computer program can be executed on the computing device as shown in FIG. 9. The storage of the computing device can store various program templates that compose the context-based multi-turn dialogue apparatus. For example, the historical dialogue word feature extracting module 802, the candidate answer feature extracting module 804, the partial semantic relationship matching module 806, the matching probability calculating module 808, and the matching answer determining module 810.

In one embodiment, a computer readable storage medium is provided. The storage medium stores a computer program, and a processor executes the following steps when the computer program is executed by the processor:

obtaining to-be-matched historical dialogue information;

performing a word feature extraction based on the to-be-matched historical dialogue information to obtain a historical dialogue word embedding;

obtaining candidate answer information;

performing the word feature extraction based on the candidate answer information to obtain a candidate answer word embedding;

obtaining a historical dialogue partial matching vector and a candidate answer partial matching vector by performing partial semantic relationship matching based on the historical dialogue word embedding and the candidate answer word embedding;

obtaining a candidate answer matching probability by performing a matching probability calculation based on the historical dialogue partial matching vector and the candidate answer partial matching vector; and determining matched answer information based on the candidate answer information and the candidate answer matching probability.

In this embodiment, when the computer program is executed by the processor, it obtains the historical dialogue word embedding by performing the word feature extraction on the to-be-matched historical dialogue information, and performs the word feature extraction based on the candidate answer information to obtain the candidate answer word embedding, so as to extract the historical dialogue word embedding according to the feature of the context and extract the candidate answer word embedding according to the features of the answer sequence, thereby better capturing the bidirectional relationship and association information of the context. Then the partial semantic relationship matching is performed based on the historical dialogue word embedding and the candidate answer word embedding to obtain the historical dialogue partial matching vector and the candidate answer partial matching vector, thereby realizing the sufficient matching of the context and the answer.

In one embodiment, the step of obtaining to-be-matched historical dialogue information includes: obtaining historical dialogue information; and obtaining the to-be-matched historical dialogue information by performing a forward obtaining on the historical dialogue information according to a preset word length.

In one embodiment, the step of performing a word feature extraction based on the to-be-matched historical dialogue information to obtain a historical dialogue word embedding includes: performing a token extraction on the to-be-matched historical dialogue information to obtain the to-be-predicted historical dialogue tokens; and inputting each token in the entire to-be-predicted historical dialogue tokens into a pre-trained model for prediction to obtain the historical dialogue word embedding.

In one embodiment, the step of performing a token extraction on the to-be-matched historical dialogue information to obtain the to-be-predicted historical dialogue tokens includes: generating a historical dialogue sequence by inserting at least one of sentence breaks and turn breaks to the to-be-matched historical dialogue information; performing a word segmentation on the historical dialogue sequence to obtain a to-be-processed historical dialogue token; extracting the to-be-processed historical dialogue token according to a preset historical dialogue length to obtain a standard historical dialogue token; and inserting a classifier at a beginning of the standard historical dialogue token and a separator at an end of the standard historical dialogue token to obtain the to-be-predicted historical dialogue token.

In one embodiment, the step of extracting the to-be-processed historical dialogue token according to the preset historical dialogue length to obtain the standard historical dialogue token includes: obtaining the preset historical dialogue length; deleting tokens from a beginning of the to-be-processed historical dialogue token in response to the number of the tokens in the to-be-processed historical dialogue token being larger than the preset historical dialogue length, until the number of the tokens in the to-be-processed historical dialogue token is equal to the preset historical dialogue length, and using the other tokens remained in the to-be-processed historical dialogue token as the standard historical dialogue token; and using the to-be-processed historical dialogue token as the standard historical dialogue token in response to the number of the tokens in the to-be-processed historical dialogue token being less than or equal to the preset historical dialogue length.

In one embodiment, the step of performing the word feature extraction based on the to-be-matched historical dialogue information to obtain the historical dialogue word embedding includes: performing the token extraction on the candidate answer information to obtain a to-be-predicted candidate answer token; and inputting each token in the entire to-be-predicted candidate answer token into a pre-trained model for prediction to obtain the candidate answer word embedding.

In one embodiment, the step of performing the token extraction on the candidate answer information to obtain a to-be-predicted candidate answer token includes: performing a word segmentation on the candidate answer information to obtain a to-be-processed candidate answer token; extracting the to-be-processed candidate answer token according to the preset candidate answer length to obtain a standard candidate answer token; and inserting a classifier at a beginning of the standard candidate answer token and inserting a separator at an end of the standard candidate answer token to obtain the to-be-predicted candidate answer token.

In one embodiment, the step of extracting the to-be-processed candidate answer token according to the preset candidate answer length to obtain a standard candidate answer token includes: obtaining the preset candidate answer length; deleting tokens from the end of the to-be-processed candidate answer token in response to the number of the tokens in the to-be-processed candidate answer token being larger than the preset candidate answer length, until the number of the tokens in the to-be-processed candidate answer tokens is equal to the preset candidate answer length, and using the other tokens remained in the to-be-processed candidate answer token as the standard candidate answer token; and using the to-be-processed candidate answer token as the standard candidate answer token in response to the number of the tokens in the to-be-processed candidate answer tokens being less than or equal to the preset candidate answer length.

In one embodiment, the step of obtaining a historical dialogue partial matching vector and a candidate answer partial matching vector by performing partial semantic relationship matching based on the historical dialogue word embedding and the candidate answer word embedding includes: performing an attention weight calculation based on the historical dialogue word embedding and the candidate answer word embedding to obtain an attention weight; aligning the historical dialogue word embeddings with the candidate answer word embeddings using a token as a unit; and performing a partial semantic relationship matching on the aligned historical dialogue word embeddings and the candidate answer word embeddings using a token as a unit to obtain the historical dialogue partial matching vector and the candidate answer partial matching vector.

In one embodiment, the step of obtaining the candidate answer matching probability by performing the matching probability calculation based on the historical dialogue partial matching vector and the candidate answer partial matching vector includes: inputting the historical dialogue partial matching vector into a BiLSTM layer for key vector identification to obtain a historical dialogue hidden vector; inputting the candidate answer partial matching vector into the BiLSTM layer for key vector identification to obtain a candidate answer hidden vector; performing a max pooling on each of the historical dialogue hidden vector and the candidate answer hidden vector to obtain a historical dialogue max pooling vector and a candidate answer max pooling vector, respectively; performing an average pooling on each of the historical dialogue hidden vector and the candidate answer hidden vector to obtain a historical dialogue average pooling vector and a candidate answer average pooling vector, respectively; and performing a matching probability calculation based on the historical dialog max pooling vector, the historical dialog average pooling vector, the candidate answer max pooling vector, and the candidate answer average pooling vector to obtain the candidate answer matching probability.

In one embodiment, the step of performing the matching probability calculation based on the historical dialog max pooling vector, the historical dialog average pooling vector, the candidate answer max pooling vector, and the candidate answer average pooling vector to obtain the candidate answer matching probability includes: concatenating the candidate answer max pooling vector, the candidate answer average pooling vector, the historical dialogue max pooling vector, and the historical dialogue average pooling vector in sequence to obtain a to-be-classified vector; and inputting the to-be-classified vector into a multi-layer perceptron for performing the matching probability calculation to obtain the candidate answer matching probability.

In one embodiment, the multi-layer perceptron includes a hidden layer, a tan h activation function, and a softmax output layer.

It should be noted that, the above-mentioned context-based multi-turn dialogue method, context-based multi-turn dialogue apparatus, storage medium, and computing device belong to a general inventive concept, and the contents in the embodiments of the context-based multi-turn dialogue method, context-based multi-turn dialogue apparatus, storage medium, and computing device is mutually applicable.

It can be understood by those skilled in the art that, all or part of the process of the method of the above-mentioned embodiment can be implemented by a computer program to instruct related hardware. The program can be stored in a non-volatile computer readable storage medium. When the program is executed, which can include the process of each method embodiment as described above. In which, any reference to a storage, a memory, a database or other medium used in each embodiment provided by the present disclosure may include non-volatile and/or volatile memory. Non-volatile memory can include read only memory (ROM), programmable ROM (PROM), electrically programmable ROM (EPROM), electrically erasable programmable ROM (EEPROM), or flash memory. Volatile memory can include random access memory (RAM) or external cache memory. As a description rather than a limitation, RAM can be in a variety of formats such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), rambus direct RAM (RDRAM), direct rambus DRAM (DRDRAM), and rambus DRAM (RDRAM).

The technical features of the above-mentioned embodiments can be arbitrarily combined. For the sake of brevity of description, the descriptions do not include all possible combinations of the technical features in the above-mentioned embodiments. However, the combination of these technical features will be considered to be within the scope described in this specification as long as there is no contradiction.

The above-mentioned embodiments are merely illustrative of several embodiments of the present disclosure. Although the description is specific and detailed, it should not to be comprehended as limiting the scope of the present disclosure. It should be noted that, for those skilled in the art, a number of variations and improvements can still be made without departing from the spirit and scope of the present disclosure. Therefore, the scope of the present disclosure should be determined by the appended claims.

What is claimed is:

1. A context-based multi-turn dialogue method, comprising steps of:
    obtaining to-be-matched historical dialogue information;
    performing a word feature extraction based on the to-be-matched historical dialogue information to obtain a historical dialogue word embedding;
    obtaining candidate answer information;
    performing the word feature extraction based on the candidate answer information to obtain a candidate answer word embedding;
    obtaining a historical dialogue partial matching vector and a candidate answer partial matching vector by performing partial semantic relationship matching based on the historical dialogue word embedding and the candidate answer word embedding;
    obtaining a candidate answer matching probability by performing a matching probability calculation based on the historical dialogue partial matching vector and the candidate answer partial matching vector; and
    determining matched answer information based on the candidate answer information and the candidate answer matching probability;
    wherein the step of performing the word feature extraction based on the to-be-matched historical dialogue information to obtain the historical dialogue word embedding comprises:
        performing a token extraction on the to-be-matched historical dialogue information to obtain a to-be-predicted historical dialogue token; and
        inputting the to-be-predicted historical dialogue token into a pre-trained model for prediction to obtain the historical dialogue word embedding with contextual meaning;
    wherein the step of performing the token extraction on the to-be-matched historical dialogue information to obtain the to-be-predicted historical dialogue token comprises:
        generating a historical dialogue sequence by inserting at least one of sentence breaks and turn breaks to the to-be-matched historical dialogue information;
        performing a word segmentation on the historical dialogue sequence to obtain a to-be-processed historical dialogue token;

extracting the to-be-processed historical dialogue token according to a preset historical dialogue length to obtain a standard historical dialogue token; and inserting a first classifier at a beginning of the standard historical dialogue token and a first separator at an end of the standard historical dialogue token to obtain the to-be-predicted historical dialogue token;

wherein the step of extracting the to-be-processed historical dialogue token according to the preset historical dialogue length to obtain the standard historical dialogue token comprises:

obtaining the preset historical dialogue length;

deleting tokens from a beginning of the to-be-processed historical dialogue token in response to the number of the tokens in the to-be-processed historical dialogue token being larger than the preset historical dialogue length, until the number of the tokens in the to-be-processed historical dialogue token is equal to the preset historical dialogue length, and using the other tokens remaining in the to-be-processed historical dialogue token as the standard historical dialogue token; and using the to-be-processed historical dialogue token as the standard historical dialogue token in response to the number of the tokens in the to-be-processed historical dialogue token being less than or equal to the preset historical dialogue length;

wherein the step of performing the word feature extraction based on the candidate answer information to obtain the candidate answer word embedding comprises:

performing the token extraction on the candidate answer information to obtain a to-be-predicted candidate answer token; and inputting the to-be-predicted candidate answer token into the pre-trained model for prediction to obtain the candidate answer word embedding with the contextual meaning;

wherein the pre-trained model is a word feature extraction neural network model, the word feature extraction neural network model uses a transformer as a framework of an algorithm, and uses a masked language prediction and a next sentence prediction to perform a pre-training; and wherein the masked language prediction and the next sentence prediction are unsupervised prediction tasks; and wherein the step of performing the token extraction on the candidate answer information to obtain the to-be-predicted candidate answer token comprises:

performing a word segmentation on the candidate answer information to obtain a to-be-processed candidate answer token;

extracting the to-be-processed candidate answer token according to a preset candidate answer length to obtain a standard candidate answer token; and inserting a second classifier at a beginning of the standard candidate answer token and inserting a second separator at an end of the standard candidate answer token to obtain the to-be-predicted candidate answer token;

wherein the step of extracting the to-be-processed candidate answer token according to the preset candidate answer length to obtain the standard candidate answer token comprises:

obtaining the preset candidate answer length;

deleting tokens from the end of the to-be-processed candidate answer token in response to the number of the tokens in the to-be-processed candidate answer token being larger than the preset candidate answer length, until the number of the tokens in the to-be-processed candidate answer tokens is equal to the preset candidate answer length, and using the other tokens remained remaining in the to-be-processed candidate answer token as the standard candidate answer token; and using the to-be-processed candidate answer token as the standard candidate answer token in response to the number of the tokens in the to-be-processed candidate answer tokens being less than or equal to the preset candidate answer length; and wherein the step of obtaining the candidate answer matching probability by performing the matching probability calculation based on the historical dialogue partial matching vector and the candidate answer partial matching vector comprises:

inputting the historical dialogue partial matching vector into a BiLSTM layer for key vector identification to obtain a historical dialogue hidden vector;

inputting the candidate answer partial matching vector into the BiLSTM layer for key vector identification to obtain a candidate answer hidden vector;

performing a max pooling on each of the historical dialogue hidden vector and the candidate answer hidden vector to obtain a historical dialogue max pooling vector and a candidate answer max pooling vector, respectively;

performing an average pooling on each of the historical dialogue hidden vector and the candidate answer hidden vector to obtain a historical dialogue average pooling vector and a candidate answer average pooling vector, respectively; and performing a matching probability calculation based on the historical dialog max pooling vector, the historical dialog average pooling vector, the candidate answer max pooling vector, and the candidate answer average pooling vector to obtain the candidate answer matching probability.

2. The method of claim 1, wherein the step of obtaining the to-be-matched historical dialogue information comprises:

obtaining historical dialogue information; and obtaining the to-be-matched historical dialogue information by performing a forward obtaining on the historical dialogue information according to a preset word length.

3. The method of claim 1, wherein the step of obtaining the historical dialogue partial matching vector and the candidate answer partial matching vector by performing partial semantic relationship matching based on the historical dialogue word embedding and the candidate answer word embedding comprises:

performing an attention weight calculation based on the historical dialogue word embedding and the candidate answer word embedding to obtain an attention weight;

aligning the historical dialogue word embeddings with the candidate answer word embeddings using a token as a unit; and performing a partial semantic relationship matching on the aligned historical dialogue word embeddings and the candidate answer word embeddings using a token as a unit to obtain the historical dialogue partial matching vector and the candidate answer partial matching vector.

4. The method of claim 1, wherein the step of performing the matching probability calculation based on the historical dialog max pooling vector, the historical dialog average pooling vector, the candidate answer max pooling vector, and the candidate answer average pooling vector to obtain the candidate answer matching probability comprises:
concatenating the candidate answer max pooling vector, the candidate answer average pooling vector, the historical dialogue max pooling vector, and the historical dialogue average pooling vector in sequence to obtain a to-be-classified vector; and
inputting the to-be-classified vector into a multi-layer perceptron for performing the matching probability calculation to obtain the candidate answer matching probability.

5. The method of claim 4, wherein the multi-layer perceptron comprises a hidden layer, a tan h activation function, and a softmax output layer.

6. The method of claim 1, wherein candidate answer matching probabilities are obtained, and the step of determining the matched answer information based on the candidate answer information and the candidate answer matching probability comprises:
selecting a highest probability from all the candidate answer matching probabilities;
when the highest probability corresponds to one candidate answer information, using the candidate answer information corresponding to the highest probability as the matched answer information;
when the highest probability corresponds to at least two candidate answer information, obtaining a dialogue type;
when the dialogue type is a task-oriented dialogue, using all the candidate answer information corresponding to the highest probability as the matched answer information; and
when the dialogue type is a chat-oriented dialogue, using target candidate answer information in the at least two candidate answer information corresponding to the highest probability as the matched answer information, and the target candidate answer information has a token of a longest length.

7. The method of claim 1, wherein the step of generating the historical dialogue sequence by inserting the at least one of sentence breaks and turn breaks to the to-be-matched historical dialogue information comprises:
embedding a sentence break at an end of each sentence of the to-be-matched historical dialogue information;
embedding a turn break at an end of each sentence of the to-be-matched historical dialogue information; and
connecting the to-be-matched historical dialogue information added with the sentence break and the turn break as the historical dialogue sequence, and wherein for a sentence that needs to embed the sentence break and the turn break simultaneously, the turn break is placed after the sentence break.

8. The method of claim 1, wherein the preset historical dialogue length plus a token length of the added first classifier and first separator is used as a maximum length of the to-be-predicted historical dialogue token.

9. A non-transitory computer-readable storage medium storing one or more computer programs executable on a processor to implement a context-based multi-turn dialogue method, wherein the one or more computer programs comprise:
instructions for obtaining to-be-matched historical dialogue information;
instructions for performing a word feature extraction based on the to-be-matched historical dialogue information to obtain a historical dialogue word embedding;
instructions for obtaining candidate answer information;
instructions for performing the word feature extraction based on the candidate answer information to obtain a candidate answer word embedding;
instructions for obtaining a historical dialogue partial matching vector and a candidate answer partial matching vector by performing partial semantic relationship matching based on the historical dialogue word embedding and the candidate answer word embedding;
instructions for obtaining a candidate answer matching probability by performing a matching probability calculation based on the historical dialogue partial matching vector and the candidate answer partial matching vector; and
instructions for determining matched answer information based on the candidate answer information and the candidate answer matching probability;
wherein the instructions for performing the word feature extraction based on the to-be-matched historical dialogue information to obtain the historical dialogue word embedding comprises:
instructions for performing a token extraction on the to-be-matched historical dialogue information to obtain a to-be-predicted historical dialogue token; and
instructions for inputting the to-be-predicted historical dialogue token into a pre-trained model for prediction to obtain the historical dialogue word embedding with contextual meaning;
wherein the instructions for performing the token extraction on the to-be-matched historical dialogue information to obtain the to-be-predicted historical dialogue token comprise:
instructions for generating a historical dialogue sequence by inserting at least one of sentence breaks and turn breaks to the to-be-matched historical dialogue information;
instructions for performing a word segmentation on the historical dialogue sequence to obtain a to-be-processed historical dialogue token;
instructions for extracting the to-be-processed historical dialogue token according to a preset historical dialogue length to obtain a standard historical dialogue token; and
instructions for inserting a first classifier at a beginning of the standard historical dialogue token and a first separator at an end of the standard historical dialogue token to obtain the to-be-predicted historical dialogue token;
wherein the instructions for extracting the to-be-processed historical dialogue token according to the preset historical dialogue length to obtain the standard historical dialogue token comprise:
instructions for obtaining the preset historical dialogue length;
instructions for deleting tokens from a beginning of the to-be-processed historical dialogue token in response to the number of the tokens in the to-be-processed historical dialogue token being larger than the preset historical dialogue length, until the number of the tokens in the to-be-processed historical dialogue token is equal to the preset historical dialogue length, and using the other tokens remaining in the to-beprocessed historical dialogue token as the standard historical dialogue token; and
instructions for using the to-be-processed historical dialogue token as the standard historical dialogue token in response to the number of the tokens in the to-be-processed historical dialogue token being less than or equal to the preset historical dialogue length;
wherein the instructions for performing the word feature extraction based on the candidate answer information to obtain the candidate answer word embedding comprise:
instructions for performing the token extraction on the candidate answer information to obtain a to-be-predicted candidate answer token; and
instructions for inputting the to-be-predicted candidate answer token into the pre-trained model for prediction to obtain the candidate answer word embedding with the contextual meaning;
wherein the pre-trained model is a word feature extraction neural network model, the word feature extraction neural network model uses a transformer as a framework of an algorithm, and uses a masked language prediction and a next sentence prediction to perform a pre-training; and
wherein the masked language prediction and the next sentence prediction are unsupervised prediction tasks; and
wherein the instructions for performing the token extraction on the candidate answer information to obtain the to-be-predicted candidate answer token comprise:
instructions for performing a word segmentation on the candidate answer information to obtain a to-be-processed candidate answer token;
instructions for extracting the to-be-processed candidate answer token according to a preset candidate answer length to obtain a standard candidate answer token; and
instructions for inserting a second classifier at a beginning of the standard candidate answer token and inserting a second separator at an end of the standard candidate answer token to obtain the to-be-predicted candidate answer token;
wherein the instructions for extracting the to-be-processed candidate answer token according to the preset candidate answer length to obtain the standard candidate answer token comprise:
instructions for obtaining the preset candidate answer length;
instructions for deleting tokens from the end of the to-be-processed candidate answer token in response to the number of the tokens in the to-be-processed candidate answer token being larger than the preset candidate answer length, until the number of the tokens in the to-be-processed candidate answer tokens is equal to the preset candidate answer length, and using the other tokens remained remaining in the to-be-processed candidate answer token as the standard candidate answer token; and
instructions for using the to-be-processed candidate answer token as the standard candidate answer token in response to the number of the tokens in the to-be-processed candidate answer tokens being less than or equal to the preset candidate answer length; and
wherein the instructions for obtaining the candidate answer matching probability by performing the matching probability calculation based on the historical dialogue partial matching vector and the candidate answer partial matching vector comprise:
instructions for inputting the historical dialogue partial matching vector into a BiLSTM layer for key vector identification to obtain a historical dialogue hidden vector;
instructions for inputting the candidate answer partial matching vector into the BiLSTM layer for key vector identification to obtain a candidate answer hidden vector;
instructions for performing a max pooling on each of the historical dialogue hidden vector and the candidate answer hidden vector to obtain a historical dialogue max pooling vector and a candidate answer max pooling vector, respectively;
instructions for performing an average pooling on each of the historical dialogue hidden vector and the candidate answer hidden vector to obtain a historical dialogue average pooling vector and a candidate answer average pooling vector, respectively; and
instructions for performing a matching probability calculation based on the historical dialog max pooling vector, the historical dialog average pooling vector, the candidate answer max pooling vector, and the candidate answer average pooling vector to obtain the candidate answer matching probability.

10. The storage medium of claim 9, wherein the instructions for obtaining the to-be-matched historical dialogue information comprise:
instructions for obtaining historical dialogue information; and
instructions for obtaining the to-be-matched historical dialogue information by performing a forward obtaining on the historical dialogue information according to a preset word length.

* * * * *